United States Patent Office 3,028,242
Patented Apr. 3, 1962

3,028,242
COCOA BEVERAGE POWDER AND METHOD
OF MAKING THE SAME
James F. Hale, Syracuse, and Watson B. Smith, North Syracuse, N.Y., assignors to The Borden Company, New York, N.Y., a corporation of New Jersey
No Drawing. Filed Apr. 14, 1960, Ser. No. 22,132
5 Claims. (Cl. 99—26)

This invention relates to a beverage powder and the process of making it. The invention is particularly useful in making an improved cocoa and will be illustrated in connection therewith.

Briefly stated, the invention comprises a composite beverage powder with a granulated sugar or malted milk base, lecithin or other edible water swellable bonding material adhered in small proportion to the base, and cocoa malted milk, or like food powder adhered to the said bonding material. In the preferred embodiment the invention comprises pulverized sugar interspersed between the particles of the final powder.

The invention comprises also the herein described process of making the composite powder.

An example of the granulated sugar that we use as the base material is bakers' special sugar, either beet or cane. While granulated dextrose or lactose may be used for some purposes, they give no advantage that offsets the disadvantage unless in special formulations to meet particular needs.

The lecithin used to coat the granules of the base material and bond lightly the said material and later other powder applied thereover is any commercial grade. In fact, the commercial, less refined grades of lecithin seem to work somewhat better in our composition than the more highly purified lecithin, this advantage being considered to be due in part to the wider range of softening temperature of the commercial material and, therefore, a wider range of temperature over which the lecithin is tacky or sticky during the preparation of the beverage powder.

As the food powder to be added, we use ordinarily a fatty nutrient such as cocoa powder, either Dutch or natural process with fat content about 8%–25%. In place of the cocoa powder we may use other powdered nutrients that are commonly found in beverages, as, for example, malted milk, and malted milk mixtures, and chocolate flavored mixtures. Any of the powders may be mixed with vitamins, minerals, and the like that are conventionally used in making vitamin and mineral fortified beverages.

The pulverized material which is interspersed between the composite particles, such as those of sugar, lecithin, and cocoa, is a sugar or a mixture containing sugar. Examples that meet these requirements and that are used are the pulverized sugars, pulverized sucrose being the one ordinarily selected, although lactose, dextrose, maltose, or other like soluble sugar in powder form may be substituted if desired for special effects.

Additional flavor materials may be incorporated to suit the taste. While vanilla is the flavor selected for general use, any other common food flavor may be substituted in place of the vanilla, in conventional proportion and at the stage illustrated herein by the use of the vanilla flavoring material, suitably in admixture with the cocoa powder or the alternative therefor.

The granulated sugar base material is used ordinarily in excess of the proportion of any other component present. The said nutrient powder, such as the cocoa disposed in contact with the lecithin and the pulverized sugar, is in excess of the amount of lecithin and of any flavoring material added. Suitable proportions, for 100 parts of the said base material, are 0.5–4 of lecithin or other bonding material of kind described, 8–60 of the said nutrient such as cocoa, 0.5–2 of the flavoring agent such as vanilla (vanillin), and 20–80 of the pulverized sugar or other admixture between the said composite particles, i.e., at least 5 times the lecithin content.

The conditions of compounding are important. The sugar is heated and maintained during the compositing at an elevated temperature above the melting point of the lecithin and below the melting point of the sugar. The lecithin, illustrating the bonding material, is applied in molten condition to the granules of the heated sugar, the term molten including heat softened. Suitable temperatures for the heating of the sugar to adhere the lecithin are within the range about 130°–190° F. Onto the sugar so heated we then apply, slowly and with mixing, the molten lecithin, the rate of addition and the stirring being controlled so as to obtain good distribution of the lecithin in the mass of heated sugar. The stirring of the mass is continued until the lecithin is adhered to substantially all of the particles of the granulated sugar.

While the lecithin so applied is still in molten or tacky condition, the cocoa or other nutrient powder is introduced and the whole stirred until the said powder is uniformly distributed and, in fact, largely adhered by the lecithin to the base material.

If additional flavoring material, such as vanilla powder or a mixture thereof with usual modifying agent, is to be used, it is suitably introduced in premixed condition with the cocoa or the like.

There is then applied the pulverized sugar. This is interspersed between the granules of the composited particles made as described and adhered to the lecithin or other nutrient powder. The resulting product has a greater bulk density than one in which the granules of sugar are not adhered to lecithin.

The product so made shows coherence between the particles and is not free flowing. Yet the product does not cake into hard lumps except when malted milk is used as a principal ingredient. The product is dispersible with agitation in water or milk, to provide an improved chocolate beverage.

The invention will be further illustrated by description in connection with the following specific examples of the practice of it. In these examples and elsewhere herein proportions are expressed as parts by weight unless specifically stated to the contrary.

*Example 1*

| Formula: | Lbs. |
|---|---|
| Sucrose, as fine granular sugar | 53 |
| Lecithin, "Yelkin BTS" | 1.5 |
| Cocoa, Dutch process, 10%–12% fat | 18.5 |
| Vanilla flavoring (vanillin powder) | 1 |
| Sucrose, as pulverized sugar | 26 |

The fine granular sucrose, otherwise known as coating sugar, is heated to and maintained at 150° F. in a steam jacketed candy kettle provided with an agitator and using low pressure steam as the heating medium. The lecithin is heated separately to 150° F. and agitated, to provide uniform heating and to prevent scorching and charring. The heated sugar is then placed in a ribbon blender type mixer, such as a Day Mixer. The mixer is started and the heated lecithin is poured or sprayed slowly and uniformly onto the sugar, this requiring about 1 minute. Mixing is continued for 4 minutes or until the lecithin is uniformly dispersed over substantially all the particles of the sugar. Next, the cocoa and flavoring are added and mixed for 4 minutes or until uniformly mixed with the sugar at a temperature at which the lecithin coating is still tacky, as at 135°–160° F. The pulverized sucrose (confectioners' or powdered sugar) at room temperature is then added and mixing is continued for 10 minutes. The resulting powder is removed from the mixer and sifted through a 16-mesh screen, to break up lumps. The material recovered from this processing has a minimum bulk density of 2.1 cubic inches per ounce. By contrast, a product that is comparable except for omission of the lecithin gives a minimum bulk density of 1.8 cubic inches per ounce with no lecithin.

Example 2

The formula and procedure of Example 1 were followed except that the granulated sugar was reduced to 39.5 pounds and the pulverized sugar added later was increased to 39.5 pounds. This product had a minimum bulk density of 2.3 cubic inches per ounce.

Example 3

The formula and procedure of Example 1 were followed except that the 1.5 pounds of lecithin was replaced by 2 pounds of a mixture of equal weights of lecithin and corn oil.

In place of the corn oil in this example there may be used other liquid fatty oils, as for example soybean or cottonseed oil. The use of any vegetable oil, however, is considered undesirable because of its tendency to undergo oxidation and development of off-flavor materials in the finished powder in storage and on exposure to air.

Example 4

The procedure and proportions of Example 1 are used except that all of the sugar used in pulverized, part of the pulverized sugar (20 pounds) is heated to 150° F., the molten lecithin is applied to this part of the sugar with a pneumatic atomizing nozzle of conventional type, the cocoa and flavoring are next added and uniformly mixed and then the remainder of the pulverized sugar is introduced at room temperature and mixed. This gives a product with a minimum bulk density of 2.5 cubic inches per ounce.

Example 5

Granulated sucrose in the amount of 15 pounds is heated to a temperature within the range 150°–160° F. and maintained there while 1.5 pounds of lecithin of somewhat yellow commercial grade are applied slowly and stirred in, the lecithin being preheated separately to a temperature above its softening point as to 150° F.

When the lecithin has been completely introduced and adhered over substantially all of the particles of granulated sugar, then there is introduced a mixture of 10 pounds of cocoa powder (fat content about 10%–12%) with 0.25 pound of the sodium salt of carboxymethylcellulose as a stabilizer. When the mixture has been made uniform and the cocoa has been distributed and adhered over the lecithin, then there is admixed 7 pounds of pulverized sucrose.

In a modification of this example, 1 pound of vanilla flavoring is incorporated at a stage before the application of the pulverized sugar.

In another modification of this example, the carboxymethylcellulose stabilizer is replaced by an equal weight of any of the other commonly used stabilizers for increasing the viscosity or decreasing the rate of settling of reconstituted beverage powders, as, for instance, methylcellulose, sodium alginate, or locust bean gum extract.

Example 6

The procedure and proportions of Example 1 are used except that the pulverized sugar is replaced by an equal weight of malted milk powder. The result is a chocolate flavored malted milk.

Example 7

The procedure and proportions of Example 1 are followed except that the pulverized sugar is replaced by an equal weight of a mixture of malted milk and pulverized sugar in the proportion of 30–40 parts of the malted milk for 100 parts total weight of the mixed malted milk and sugar.

Example 8

100 pounds of fine granular sugar (sucrose) is heated and maintained at 150° F. and stirred while 3 pounds of molten lecithin are sprayed thereover, the stirring being continued until the lecithin is substantially uniformly distributed over the particles of the sugar. Into the resulting mixture, still in tacky condition, there are admixed 30 pounds of cocoa in powder form and subsequently 60 pounds of malted milk powder.

The products made as described are readily dispersible in water or milk, to give a cocoa or a chocolate malted beverage.

It is to be understood that it is intended to cover all changes and modifications of the examples of the invention herein chosen for the purpose of illustration which do not constitute departures from the spirit and scope of the invention.

We claim:

1. In making a beverage powder, the process which comprises heating granulated sugar to a temperature of about 130°–160° F. but below the temperature of development of off-flavor therein, heating lecithin to the temperature of becoming molten, mixing the heated granular sugar and the molten lecithin until the lecithin becomes adhered in tacky form to the particles of the sugar, and then admixing a powder selected from the group consisting of cocoa and malted milk.

2. The process of claim 1, the proportions of the several ingredients being about 100 parts of the base material, 0.5–4 parts of lecithin, and 20–80 parts of the said powder.

3. In making a cocoa beverage powder, the process which comprises heating 100 parts of granulated sugar to a temperature of about 130°–160° F., heating lecithin to the temperature of melting thereof, mixing 0.5–4 parts of the molten lecithin with the heated sugar until the lecithin adheres in tacky form to the surfaces of the particles of the said sugar, applying over the thus treated sugar and mixing therewith 8–60 parts of cocoa powder, and then mixing the composite particles so formed with about 20–80 parts of pulverized sugar.

4. The process of claim 2 in which the said powder is malted milk.

5. A cocoa beverage powder consisting essentially of composite granules comprising approximately 100 parts by weight of a granulated sugar, 0.5–4 parts by weight of lecithin, and 8–60 parts by weight of cocoa powder; and 20–80 parts by weight of a pulverized sugar interspersed between said composite granules, said composite granules being in the form of a base of said granulated sugar having adhered thereto said lecithin and said cocoa powder being in turn adhered in substantial proportion to said lecithin.

References Cited in the file of this patent

UNITED STATES PATENTS

| | | |
|---|---|---|
| 1,660,541 | Bollman | Feb. 28, 1928 |
| 2,039,739 | Rewald | Feb. 5, 1936 |
| 2,179,130 | Middleton | Nov. 7, 1939 |
| 2,430,553 | Bigelow | Nov. 11, 1947 |